May 26, 1925.
L. A. WILDMAN
NONSKID DEVICE
Filed Jan. 27, 1925
1,539,615
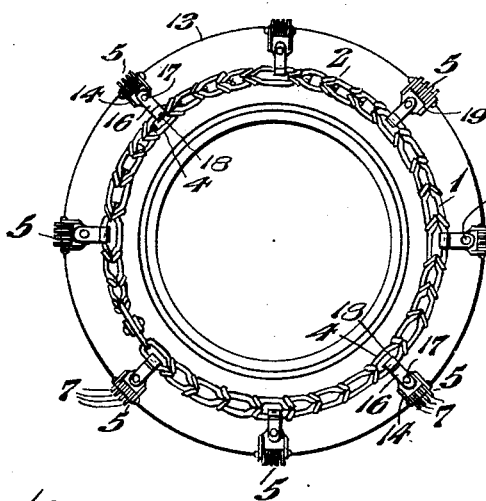
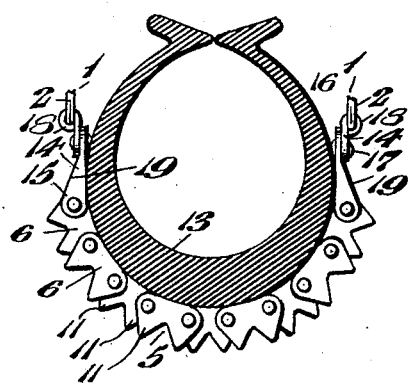
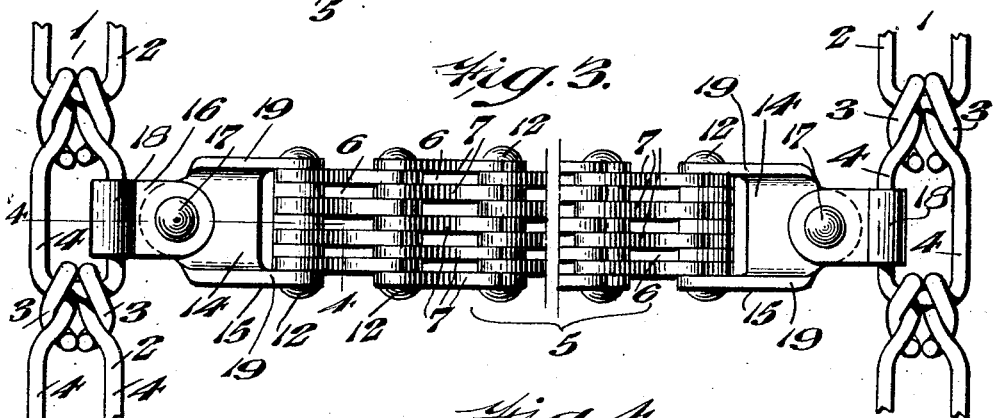
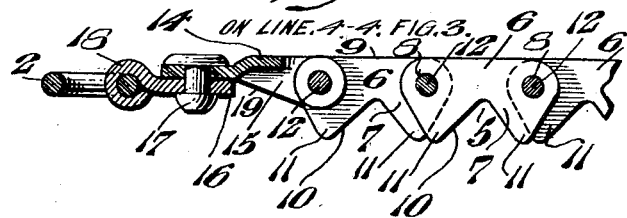
INVENTOR:
Lyman A. Wildman.
ATTORNEYS.

Patented May 26, 1925.

1,539,615

UNITED STATES PATENT OFFICE.

LYMAN A. WILDMAN, OF SOUTH BEND, INDIANA, ASSIGNOR TO UNIVERSAL SKIDLESS CHAIN CO., OF NILES, MICHIGAN, A CORPORATION OF DELAWARE.

NONSKID DEVICE.

Application filed January 27, 1925. Serial No. 4,985.

*To all whom it may concern:*

Be it known that I, LYMAN A. WILDMAN, a citizen of the United States, residing at South Bend, in the county of Saint Joseph, State of Indiana, have invented a new and useful Nonskid Device, of which the following is a specification.

My invention relates to a new and useful non-skid chain for inflated tires of automobiles and the like; of the general character described in Patent No. 1,517,875 of December 2nd, 1924, and it relates more particularly to a novel swivel connection for attaching and securing the cross chains to the side chains, whereby the strain at the junction points of the side and cross chains is reduced to a minimum.

With the above ends in view my invention consists of a pair of closed side chains, adapted to extend around the two sides respectively of the tire, near the periphery thereof, and composed of a single series of links of a suitable shape and size, and a number of evenly spaced cross chains extending transversely across the face or tread of the tire between the two side chains and secured thereto by a novel pivotal connection.

My invention further consists of a novel construction in said cross chains, whereby the same will present to the road a bearing surface of spaced pyramidal points, which will grip or bite into the surface of the road, mud, ice or snow, as the case may be, and enable the wheel to exert its driving or braking power or force, and at the same time hold the wheel against slipping or skidding.

My invention consists more particularly, however, of a novel pivotal connection between the side and cross chains, whereby the two sets of chains may be flexed with respect to one another, without any undue strain at the junction points, as is the case in chain constructions employing rigid or even semi-rigid connection between side and cross chains.

For the purpose of illustrating my invention, I have shown in the accompanying drawings forms thereof which are at present preferred by me, since they have been found in practice to give satisfactory and reliable results, although it is to be understood that the various instrumentalities of which my invention consists can be variously arranged and organized and that my invention is not limited to the precise arrangement and organization of these instrumentalities as herein shown and described.

In the drawings in which like reference characters designate like parts:—

Fig. 1 represents a side elevational view of an automobile tire equipped with a non-skid chain, embodying my invention.

Fig. 2 represents an enlarged sectional view of the tire and chain, taken about on line 2—2 of Fig. 1.

Fig. 3 represents a top plan view of one of the cross chains on an enlarged scale.

Fig. 4 represents a section on line 4—4 of Fig. 3.

Referring to the drawings, 1 designates each of the side chains, composed of a single series of links 2, having the twisted ends 3, interconnecting the adjacent links, and the straight side or body portions 4.

The cross chains 5 consist of a series of pivotally or hingedly connected links 6; each link in turn being composed of a number of similar thin flat metallic, link elements 7. The link elements 7, are provided with the pivot openings 8 near their ends, an upper straight edge 9, and a lower edge 10 including the two teeth or points 11 near the ends of the link element 7. The cross chains 5 are thus formed by mounting on transverse pivot pins or rivets 12, the link elements 7 of adjacent links 6, so that the elements of one link alternate with the elements of the adjacent link, so as to space the elements 7 of each link 6, a distance from each other equal to the thickness of the link elements, as shown particularly in Figures 3 and 4. All the link elements 7 are stamped of sheet steel with the aid of a die and are preferably hardened, thus differing from the usual bent wire chain links commonly used for the purpose.

The cross chains thus formed have the teeth or points 11 projecting outwardly of the curvature of the chain, as shown particularly in Figure 2. While the hard toothed outer surfaces of the cross chains 5 are thus adapted most effectively to engage the road or ground, the straight flush backs of the link elements 7 abreast of each other, present a highly desirable smooth contacting surface for the tire.

For the purpose of securing the cross chains to the side chains 1, each of the cross chains is provided with terminal plates 14 of the width of the cross chain, which are pivotally secured to the same, through the side flanges 15. In order to relieve the terrific strain at the junction points of the side and cross chains, which is produced by the sudden application of either driving or braking power to the wheels, I provide a highly flexible connection between said side and cross chains, by pivotally securing to the end plates 14, the hinge plates 16, by the pivot pins 17. The hinge plates 16 are provided with the eyes 18, which are bent around and secured to the straight portions 4 of the links 2 of the side chains 1. Thus instead of the rigid connections used heretofore, between the side and cross chains, I produce a hinged connection, which due to its flexibility relieves the strain at these points and prevents the breakage or distortion of the connecting members, or links of the side chains, as is evident. The pivot pins or connections 17 may be in the form of headed rivets as best seen in Figs. 3 and 4, which effectively connect the parts 14 and 16, but permit a free relative movement thereof, when the anti-skid devices are functioning, and I have found in practice, that there is a reduction of stress and strain on the side wall chains, of sixty per cent (60%) when my device is employed and in addition the appearance of the chain is considerably improved. I preferably construct the edges 19 of the side flanges 15, so that the same merge into the outer portion of the plate 14, as will be understood from Figs. 2 and 4.

It will be apparent from the foregoing, that by my novel construction and collocation of anti-skid members having the terminal plates 14 and the members 16 with the eye 18 pivoted thereto in the manner described, in conjunction with the side wall chains having their links engaging said eyes, I greatly reduce the stress and strain on the side wall chains as stated, and in addition this construction, wherein the flexible bands of substantial width having numerous thin outer road engaging points which grip the road surface and prevent side skidding and wherein the pivots pass through adjacent ends of contiguous links and are positioned directly inwardly of said outer road engaging points, provides a durable and effective structure which in conjunction with the rear rectilinear faces of the plates 14 prevents said flexible bands from unduly shifting or tipping when in use.

It will now be apparent that I have devised a novel and useful construction of nonskid device, which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. In an anti-skid device, a transverse anti-skid member composed of pivoted, thin links having outer road engaging points, and having terminal end plates provided with flanges pivotally secured thereto, and hinge plates pivotally connected to the outer ends of said terminal plates and having transverse outer eyes, adapted to be engaged by the links of the side wall chains.

2. In an anti-skid device, having a cross chain comprising a plurality of thin, flat link elements, all of one standard uniform dimension and each being provided with two outer terminal, sharp road engaging points with a recess therebetween and pivots passing transversely through adjacent ends of contiguous link elements and directly inwardly of the road engaging points, thus providing a flexible band of substantial width having numerous thin, road engaging projections, the combination of a terminal plate at each end of said flexible band, of substantially the same width as said band, and provided with a flange at each edge thereof, and side chain engaging hinge plates pivotally connected to the outer ends of said terminal plates and having eyes adapted to be engaged by the side wall chains.

3. In an anti-skid device, having a cross chain, comprising a plurality of thin, flat link elements all of one standard uniform dimension and each being provided with outer, terminal, sharp road engaging points with a recess therebetween and pivots passing transversely through adjacent ends of contiguous link elements and directly inwardly of the road engaging points, thus providing a flexible band of substantial width having numerous thin, road engaging projections, the combination of a terminal plate at each end of said flexible band, of substantially the same width as said band, and provided with a flange at each edge thereof, the outer edges of said flanges merging into said plates adjacent to said link engaging members, and side chain engaging hinge plates pivotally connected to the outer ends of said terminal plates, and having transverse eyes adapted to be engaged by the side wall chains.

LYMAN A. WILDMAN.